United States Patent [19]

Weissenstein et al.

[11] Patent Number: 4,990,382
[45] Date of Patent: Feb. 5, 1991

[54] PLASTIC CONTAINER WITH GLASS-LIKE APPEARANCE, PARISON FOR AND METHOD OF MAKING SAME

[75] Inventors: Harry Weissenstein, Woodridge; Timothy Heisel, Bartlett, both of Ill.

[73] Assignee: Continental Plastic Containers, Inc., Norwalk, Conn.

[21] Appl. No.: 95,257

[22] Filed: Sep. 11, 1987

[51] Int. Cl.⁵ .............................................. B65D 23/00
[52] U.S. Cl. ................................... 428/35.7; 428/36.6; 428/36.7; 428/515; 428/522; 428/516; 428/518; 428/475.2; 428/475.5; 428/475.8; 428/542.8; 428/213; 428/523; 215/1 C; 215/12.1; 215/12.2; 220/453; 220/455; 220/456; 264/134; 264/515
[58] Field of Search ................ 428/542.8, 35, 2, 515, 428/516, 475.8, 36.6, 36.7, 522, 523, 35.7, 36.9, 475.2, 475.5, 518, 213; 215/1 C, 12.1, 12.2; 220/453, 454, 455, 456; 264/515, 512, 514, 134, 516; 427/407.1; 156/244.13; 426/514

[56] References Cited

U.S. PATENT DOCUMENTS

| | | | |
|---|---|---|---|
| 4,092,391 | 5/1978 | Valyi | 428/36.6 |
| 4,436,778 | 3/1984 | Dugal | 428/36.7 |
| 4,481,163 | 11/1984 | Ota et al. | 215/1 C |
| 4,680,208 | 7/1987 | Aoki et al. | 215/1 C |
| 4,705,708 | 11/1987 | Briggs et al. | 428/36.7 |
| 4,713,266 | 12/1987 | Hasegawa et al. | 428/36.6 |
| 4,728,549 | 3/1988 | Shimizu et al. | 215/1 C |
| 4,741,936 | 5/1988 | Nohara et al. | 428/35 |
| 4,743,479 | 5/1988 | Nakamura et al. | 215/1 C |
| 4,751,120 | 6/1988 | Yazaki et al. | 428/35 |
| 4,755,405 | 7/1988 | Massucco et al. | 428/35 |
| 4,764,403 | 8/1988 | Ajmera et al. | 215/1 C |

Primary Examiner—Ellis P. Robinson
Assistant Examiner—Donald J. Loney
Attorney, Agent, or Firm—Charles E. Brown; Paul Shapiro; Charles A. Brown

[57] ABSTRACT

A laminated container blow molded from an extruded parison wherein both the parison and the resultant blow molded container are of a multi-layered construction. Most particularly, the parison is provided with a thin outer gloss coat which maintains the clarity and gloss of the resultant container so as to provide the container with a glass-like appearance. In the forming of the parison, the thin gloss coat is extruded with the remainder of the parison and is bonded to the remainder of the parison by an adhesive layer. The thin outer gloss coat is particularly effective when a relatively thick intermediate layer of the parison is formed of reground scrap containers. Usually the relatively thick intermediate layer is formed of a blend of the reground scrap containers and virgin polypropylene.

17 Claims, 1 Drawing Sheet

PLASTIC CONTAINER WITH GLASS-LIKE APPEARANCE, PARISON FOR AND METHOD OF MAKING SAME

This invention relates in general to new and useful improvements in the formation of plastic containers, and more particularly to the forming of containers having a multi-layer construction.

It is desired that a plastic blow molded container have a generally transparent, glass-like appearance.

It has been found that multi-layer containers, particularly when a primary intermediate layer is formed of reground container material, have a tendency to lose their clarity and gloss. In accordance with this invention, it has been found that if such containers are provided with a thin outside gloss coat, the clarity and gloss are retained.

The utilization of the outside gloss coat is particularly beneficial in maintaining the glass-like appearance of a plastic container when the thick primary intermediate layer is formed of a regrind of scrap containers.

With the above and other objects in view that will hereinafter appear, the nature of the invention will be more clearly understood by reference to the following detailed description, the appended claims, and the several views illustrated in the accompanying drawings.

Figure 1:
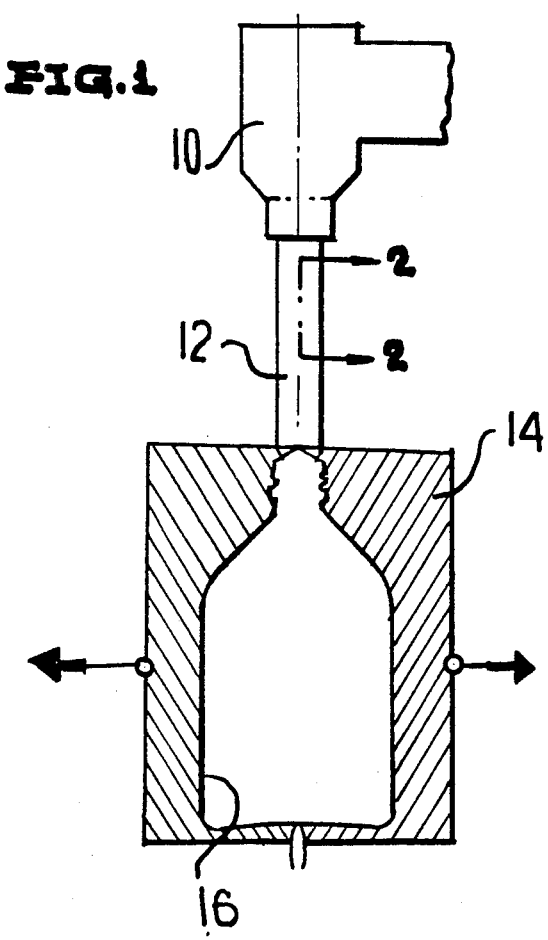
FIG. 1 is a schematic elevational view with parts shown in section of a conventional container forming apparatus including an extruder which extrudes a tubular parison and a blow mold which receives such extruded parison and effects the molding thereof into a container of a desired configuration.

It is customary to extrude a tubular preform, then clamp that tubular preform within a blow mold, and effect the blow molding of the tubular parison in accordance with the configuration of the blow mold. Such an arrangement is shown in FIG. 1 wherein there is illustrated a conventional extruder 10 which extrudes a multi-layer tubular parison 12 which, in turn, is received in a split blow mold 14 of an internal configuration for effecting the blow molding of a container 16 which is illustrated as being in the form of a bottle, but whose configuration may be varied.

This invention particularly relates to the layered construction of the parison 12 which layered construction will be the same as that of the resultant container 16. The layered construction of the parison 12 may be varied but will always include a thin outside gloss coat which is bonded to the remainder of the parison by an adhesive layer.

Figure 2:
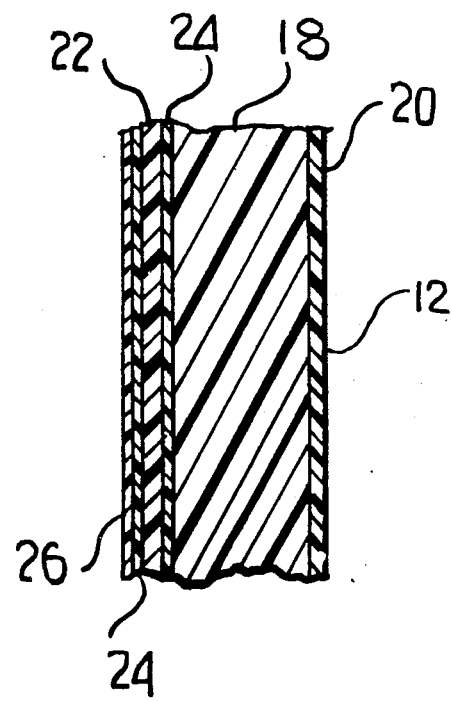
FIG. 2 is an enlarged fragmentary sectional view taken through the parison of FIG. 1 along the line 2—2 and shows the specific layered construction thereof.

In FIG. 2, the parison 12 includes a base layer which is in the form of a relatively thick, primary intermediate layer 18 which in accordance with this invention is preferably formed of reground scrap containers which have been formed of the same material as the parison 12. To the scrap container material there may be added desired percentages of virgin polypropylene.

The preform 12 of FIG. 2 is provided with an inner layer 20 which is formed of virgin polypropylene. Outside of the intermediate layer 18 is a barrier layer 22 which is preferably formed of EVOH. The barrier layer 22 is bonded to the intermediate layer 18 by a thin suitable adhesive layer 24.

The parison 12, as described, may be considered to be basic structure. To the outside of this basic structure there is added a thin gloss coat 26 which is bonded to the barrier layer 22 by a second layer of adhesive 24. It has been found that the gloss coat 26 may be best formed from plastic materials including ethylene/vinylalcohol copolymer (EVOH) and nylon and mixtures thereof.

It has been particularly found that by adding the outside gloss coat 26, particularly in the case where the intermediate layer 18 is formed of reground container stock, the resultant multi-layer container 16 will have the desired clarity and gloss so as to have a glass-like appearance.

Figure 3:
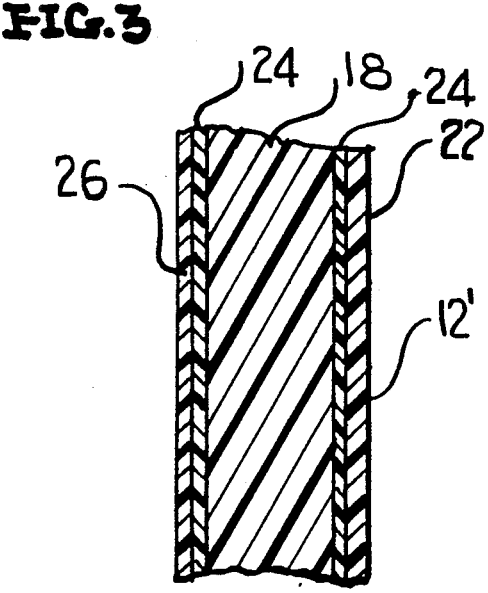
FIG. 3 is a sectional view through a modified form of parison.

Reference is next made to FIG. 3 wherein a modified form of parison 12' is illustrated. The parison 12' is similar to the parison 12 except that the virgin polypropylene inner layer 20 has been omitted and the barrier layer 22 and one of the adhesive layers 24 have been shifted so as to be interiorly of the parison. Thus the barrier layer 22 forms the inner surface of the parison 12' and is bonded to the intermediate layer 18 by an adhesive layer 24. At the same time, the thin outside gloss coat 26 is bonded to the intermediate layer 18 by one of the original adhesive layers 24.

In the parison 12', the thin outside gloss coat 26 functions in the same manner as that described above with respect to the parison 12 so that the resultant blow molded container will have the desired clarity and gloss and thus a glass-like appearance.

Figure 4:
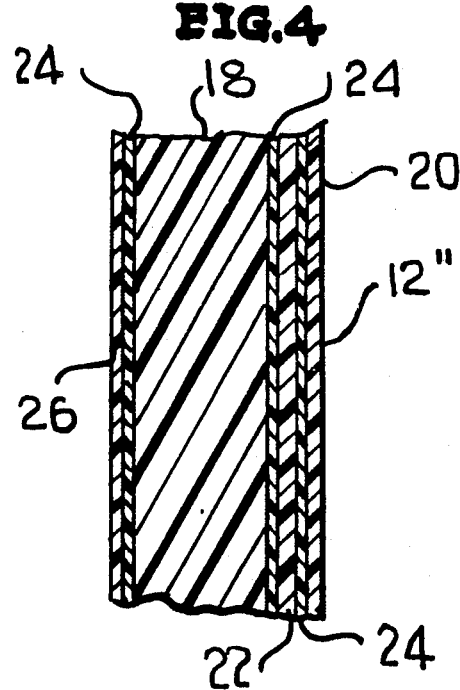
FIG. 4 is another sectional view through another modified form of parison.

Reference is now made to FIG. 4 wherein there is illustrated yet another slightly modified form of the parison which is identified as parison 12". The construction of the parison 12" resembles that of the parison 12' except that the omitted inside layer 20 of virgin polypropylene has been utilized to define the interior surface of the resultant container. However, because the barrier layer 22 is disposed radially inwardly of the intermediate layer 18, it is necessary to bond the inner layer 20 to the barrier layer 22 utilizing a third adhesive layer 24. Once again the thin outside gloss coat 26 functions to retain the clarity and gloss of the resultant container 16 and thus provide the container with a glass-like appearance.

It is to be understood that the various layers of the parison may be slightly modified. However, the outside gloss coat 26 is essential and it is most particularly beneficial in providing a container with a glass-like appearance when the relatively thick intermediate layer 18 is formed of a regrind. As stated above, the layer 18 normally is not formed solely of a regrind of scrap-like containers, but is formed of a blend of regrind and virgin polypropylene.

Although only several preferred embodiments of the invention have been specifically illustrated and described herein, it is to be understood that minor variations may be made in the layered construction of the parison without departing from the spirit and scope of the invention as defined by the appended claims.

I claim:

1. A multi-layer plastic material parison for forming a blow molded container having a glass-like appearance, said parison being in the form of an extruded tube including a thick primary intermediate layer, an inner layer for direct contact with a product, and a thin outside gloss coat forming means for giving a container blow molded from said preform a glass-like appearance, said outside gloss coat being selected from EVOH, nylon and mixtures of EVOH and nylon.

2. The parison of claim 1 wherein said thin outside gloss coat is carried by an adhesive layer.

3. The parison of claim 1 wherein there is a barrier layer between said primary intermediate layer and said outside gloss coat.

4. The parison of claim 1 wherein there is a barrier layer between said primary intermediate layer and said outside gloss coat, and adhesive layers separately joining said barrier layer to said primary intermediate layer and to said outside gloss coat.

5. A parison according to claim 4 wherein said barrier layer and said outside gloss coat are formed of the same plastic.

6. A parison according to claim 5 wherein said barrier layer and said outside gloss coat are formed of the same plastic.

7. The parison of claim 1 wherein said primary intermediate layer is formed of reground plastic containers formed from said parison, and said inner layer is a virgin layer.

8. The parison of claim 1 wherein said inner layer is a barrier layer.

9. The parison of claim 1 wherein said inner layer is a barrier layer joined to said primary intermediate layer by an adhesive layer.

10. The parison of claim 1 wherein said primary intermediate layer is formed of reground scrap material formed of containers formed from said parison.

11. The parison of claim 1 wherein said primary intermediate layer is formed of reground scrap material formed of containers formed from said parison together with a quantity of virgin polypropylene material.

12. The parison of claim 1 wherein said primary intermediate layer is formed of reground scrap material formed of containers formed from said parison together with a quantity of virgin polypropylene material, and said inner layer is a virgin layer.

13. The parison of claim 1 wherein said primary intermediate layer is formed of reground scrap material formed of containers formed from said parison together with a quantity of virgin polypropylene material, and said inner layer is a virgin layer of polypropylene.

14. The parison of claim 1 wherein said primary intermediate layer is formed of reground scrap material formed of containers formed from said parison, and said inner layer is a virgin layer of polypropylene.

15. The parison of claim 1 wherein there is a barrier layer between said primary intermediate layer and said inner layer.

16. The parison of claim 1 wherein there is a barrier layer between said primary intermediate layer and said inner layer, and an adhesive layer between each of said outside gloss coat, said primary intermediate layer, said barrier layer and said inner layer.

17. A blow molded plastic container formed from the parison of claim 1.

* * * * *